United States Patent [19]

Iwanaga et al.

[11] Patent Number: 5,700,852
[45] Date of Patent: Dec. 23, 1997

[54] PAPER COATING COMPOSITION

[75] Inventors: Shin-ichiro Iwanaga; Shigeru Shingae; Takasi Morita; Osamu Ishikawa; Norichika Nojima, all of Yokkaichi, Japan

[73] Assignee: Japan Synthetic Rubber Co., Ltd., Tokyo, Japan

[21] Appl. No.: 414,592

[22] Filed: Mar. 31, 1995

[30] Foreign Application Priority Data

Apr. 6, 1994 [JP] Japan .................................. 6-092971

[51] Int. Cl.$^6$ ........................................................ C08L 83/00
[52] U.S. Cl. ........................... 523/201; 524/458; 524/460; 524/521; 524/522
[58] Field of Search .................... 523/201; 524/460, 524/521, 522, 458

[56] References Cited

U.S. PATENT DOCUMENTS

| | | | |
|---|---|---|---|
| 4,381,365 | 4/1983 | Mishiba et al. | 524/460 |
| 4,413,068 | 11/1983 | Sinclair et al. | 523/201 |
| 4,480,078 | 10/1984 | Gujarathi | 523/201 X |
| 4,504,605 | 3/1985 | Duke et al. | 523/201 |
| 4,613,633 | 9/1986 | Sekiya et al. | 523/201 |
| 4,717,750 | 1/1988 | Makati et al. | |
| 4,742,108 | 5/1988 | Makati et al. | |
| 4,855,337 | 8/1989 | Dequatre et al. | 523/201 |
| 5,236,991 | 8/1993 | Makati et al. | 524/460 |
| 5,246,981 | 9/1993 | Kawamoto et al. | 523/201 |
| 5,273,824 | 12/1993 | Hashino et al. | 523/201 X |
| 5,354,800 | 10/1994 | Suzuki et al. | 524/460 |

FOREIGN PATENT DOCUMENTS

| | | |
|---|---|---|
| 28 21 835 | 11/1978 | Germany . |
| 3 206200 | 9/1991 | Japan . |

*Primary Examiner*—Judy M. Reddick
*Attorney, Agent, or Firm*—Oblon, Spivak, McClelland, Maier & Neustadt, P.C.

[57] ABSTRACT

A paper coating composition which comprises as a binder a latex of a copolymer (referred to hereinafter the particle A) consisting of (a) 20 to 80% by weight of an aliphatic conjugated diene monomer unit, (b) 0.5 to 10% by weight of an ethylenically unsaturated carboxylic acid monomer unit and (c) 20 to 79.5% by weight of a unit of another monomer copolymerizable with the above components (a) and (b) and having two glass transition points in the range of from −100° C. to 50° C. the difference between the two transition points being at least 5° C.

9 Claims, 1 Drawing Sheet

PAPER COATING COMPOSITION

BACKGROUND OF THE INVENTION

This invention relates to a paper coating composition, more particularly to a paper coating composition excellent in coating operability and also excellent in printability such as printing gloss, surface smoothness, surface strength, stiffness and the like.

A coated paper excellent in printability has heretofore been produced by coating a paper with a paper coating composition comprising a pigment and an aqueous binder as main components, and a copolymer latex has been used as a main binder for the paper coating composition because of its excellent bonding strength.

With recent sophistication of print and high speed printing, the performance required for the coated paper has become severe and an improvement of bonding strength, water resistance, stiffness, ink transferability, printing gloss, blister resistance and the like has become required. Moreover, for the purpose of reducing the cost, the requirement for reducing the amount of a binder has become strong and hence a binder has been desired which can exhibit a sufficient surface strength even in the reduced amount.

On the other hand, the paper production per se has been changed to a higher speed production and hence an improvement of coating operability, namely reducing the contaminater of roll surface which is the main obstacle of the operation, in other words, the lowering of the stickiness (or tackiness) of the copolymer latex, is now strongly required.

As to the copolymer latex which is the main binder of the paper coating composition, an improvement in the above-mentioned properties, particularly surface strength is particularly required, and, improved methods, for example, a method in which the gel content is controlled, a method in which the copolymer composition is varied and the like have been proposed. However, substantially all of these required physical properties are contradictory to one another and it is very difficult to balance all the properties at a high level.

For example, for the purpose of improving the bonding strength, the procedure of increasing the amount of a conjugated diene monomer to lower the glass transition point of the resulting copolymer has been adopted; however, according to this procedure, the deterioration of water resistance, stiffness and tackiness is great. On the contrary, when the glass transition point is made high, the deterioration of bonding strength and printing gloss is marked though the water resistance and stiffness are good. Moreover, the use of a monomer having a functional group in a large amount can improve the strength but makes the latex viscosity unusually high, remarkably deteriorates the workability, and makes the cost of producing the copolymer latex high.

Thus, in all the above cases, an improvement of the individual performance can be achieved, but it is impossible to satisfy all the requirements. Therefore, it is the present situation that the requirements in printing which are becoming severer have not been satisfied.

A study has heretofore been made to reconcile the contradictory properties by mixing at least two latexes having different glass transition points produced separately, but it has been impossible to obtain the aimed performance thereby.

SUMMARY OF THE INVENTION

However, it has now been surprisingly found that when a copolymer portion having a low glass transition temperature and a copolymer portion having a high glass transition temperature are present in one and the same latex particle, the aimed performance can be obtained, and as a result of further extensive research thereon, this invention has been reached.

An object of this invention is to provide a paper coating composition by which the bonding strength of a coated paper is greatly improved, excellent water resistance, stiffness, ink dryability and printing gloss are obtained, and the tackiness is reduced.

A further object of this invention is to provide a paper coating composition which is excellent in coating workability, suitable for paper-coating, particularly suitable for coating a high speed offset printing paper.

Other objects and advantages of this invention will become apparent from the following description.

According to this invention, there is provided a paper coating composition which comprises as a binder a latex of a copolymer (referred to hereinafter as the particle A) consisting of (a) 20 to 80% by weight of an aliphatic conjugated diene monomer unit, (b) 0.5 to 10% by weight of an ethylenically unsaturated carboxylic acid monomer unit and (c) 20 to 79.5% by weight of a unit of a vinylic monomer copolymerizable with the above monomers (a) and (b) wherein (a)+(b)+(c)=100% by weight, the particle A having two glass transition points in the range of from −100° C. to 50° C., and the difference between the two glass transition points being at least 5° C.

DETAILED DESCRIPTION OF THE INVENTION

Figure 1:
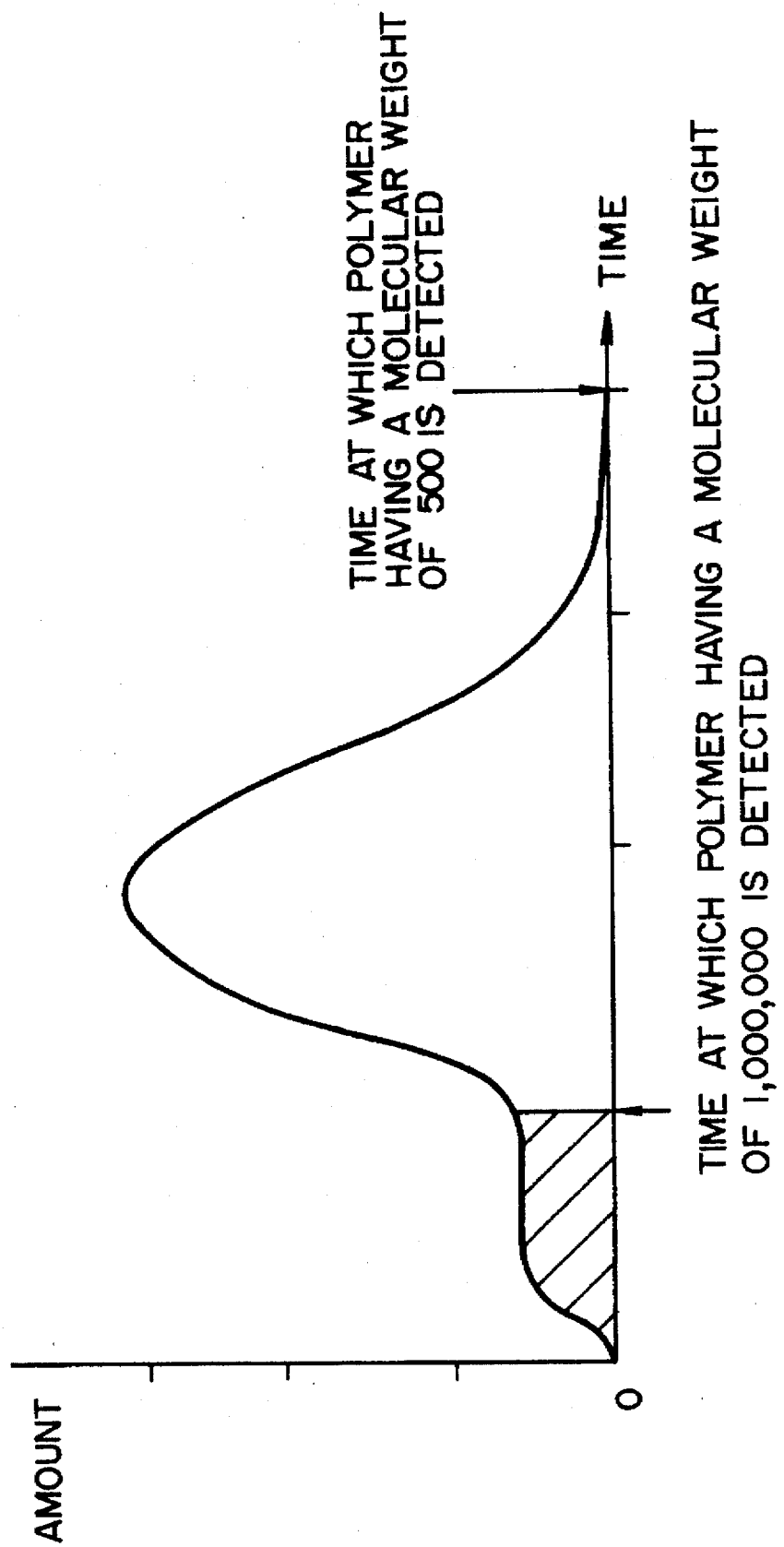
FIG. 1 shows a detection curve in which the axis of ordinate indicates detection amount and the axis of abscissa indicates detection time.

In this invention, the monomer unit means a monomer structure (or residue) after the monomer has been radically polymerized.

First of all, an explanation is made below of the latex of the particle A used as a binder in the paper coating composition of this invention.

The aliphatic conjugated diene monomer unit (a) which is one of the constituents of the particle A of this invention includes the structures (or residues) of 1,3-butadiene, isoprene, 2-chloro-1,3-butadiene, chloroprene and the like after radical polymerization, and particularly preferable are the structures of 1,3-butadiene after radical polymerization. These aliphatic conjugated diene monomer units (a) can be used alone or in combination of two or more.

Said aliphatic conjugated diene monomer unit (a) is an essential constituent for imparting suitable flexibility and elongation to the copolymer obtained and also imparting impact resistance to the copolymer. The proportion of the monomer unit (a) used is 20 to 80% by weight, preferably 30 to 70% by weight. When the proportion is less than 20% by weight, the copolymer becomes too hard and the bonding strength cannot be improved. When the proportion exceeds 80% by weight, the tackiness becomes bad.

The ethylenically unsaturated carboxylic acid monomer unit (b) includes the structures (or residues) of itaconic acid, acrylic acid, methacrylic acid, fumaric acid, maleic acid and the like after radical polymerization. These ethylenically unsaturated carboxylic acid monomer units can be used alone or in combination of two or more. The proportion of said ethylenically unsaturated carboxylic acid monomer unit (b) used is 0.5 to 10% by weight, preferably 0.8 to 8% by weight, and more preferably 1 to 5% by weight. When the proportion is less than 0.5% by weight, the stability of latex during the polymerization is low and a large amount of coagulum is formed. When the proportion exceeds 10% by weight, the viscosity of latex increases greatly and the workability becomes bad.

The unit (c) of the vinylic monomer copolymerizable with the monomers (a) and (b) includes the structures (or residues) of aromatic vinyl compounds, alkyl (meth) acrylates, vinyl cyanide compounds, vinyl acetate, acrylamide compounds and the like after radical polymerization.

Among them, the aromatic vinyl compounds include, for example, styrene, α-methylstyrene, p-methylstyrene, vinyltoluene, chlorostyrene and the like, and styrene is particularly preferred.

The alkyl (meth)acrylates include, for example, methyl acrylate, methyl methacrylate, ethyl acrylate, ethyl methacrylate, propyl acrylate, propyl methacrylate, butyl acrylate, butyl methacrylate, 2-ethylhexyl acrylate, 2-ethylhexyl methacrylate, octyl acrylate, octyl methacrylate, benzyl acrylate, benzyl methacrylate, lauryl acrylate, lauryl methacrylate, stearyl acrylate, stearyl methacrylate, isobornyl acrylate, isobornyl methacrylate, 2-cyanoethyl acrylate, 2-cyanoethyl methacrylate and the like; and methyl methacrylate is particularly preferred.

The vinyl cyanide compounds include acrylonitrile, methacrylate nitrile and the like, and acrylonitrile is particularly preferred.

The acrylamide compounds include acrylamide, methacrylamide, N-methylolacrylamide, alkyl(meth) acrylamides such as N,N-dimethylacrylamide, N,N-dimethylaminopropylacrylamide, N,N-dimethylaminopropylmethacrylamide and the like.

These copolymerizable vinylic monomer units can be used alone or in combination of two or more.

The above copolymerizable vinylic monomer unit (c) is used for the purpose of imparting to the copolymer a glass transition point suitable for the purpose, and the proportion of the monomer unit (c) contained is 20 to 79.5% by weight, preferably 25 to 69% by weight. When the proportion exceeds 79.5% by weight, the particle A becomes too hard and becomes inferior in bonding strength.

In this invention, the particle A has two different glass transition points. The characteristic feature of the present invention lies in that a copolymer portion having a low glass transition point and a copolymer portion having a high glass transition point are present in one and the same particle A. The particle A is not a mixture of two kind of particles, one having a low glass transition point and the other having a high glass transition point.

The particle A of this invention has two glass transition points in the range of −100° C. to 50° C., and preferably has a low glass transition point in the range of −100° C. to 0° C., more preferably −70° C. to −5° C. and a high glass transition point in the range of −5° C. to 50° C., more preferably 0° C. to 40° C. When the high glass transition point is higher than 50° C., the bonding strength becomes inferior and when the low glass transition point is lower than −100° C., the tackiness becomes bad.

It is necessary for realizing the effect of this invention that the particle A has two glass transition points; however, the particle A may have three or more glass transition points as far as the gist of this invention is not adversely affected thereby.

Since each of the latex particles of the particle A latex of this invention has a polymer portion having a low glass transition point of −100° C. to 0° C., the particle A has high impact resistance and hence the composition exhibits a high bonding strength. Simultaneously, the particle A has a polymer portion having a high glass transition point of from −5° C. to 50° C., and therefore, other physical properties such as water resistance, stiffness and the like can be kept, the tackiness is low and the coating workability is excellent.

Accordingly, in order to allow the above performance to appear sufficiently, the difference between the above two glass transition points of the particle A of this invention is preferably 5° C. or more, more preferably 10° C. or more, and most preferably 15° C. or more. When the difference is less than 5° C., the performance aimed at in the present invention cannot be obtained.

In the particle A, it is preferable that the polymer portion having a glass transition point in the range of from −100° C. to 0° C. is a copolymer (referred to hereinafter as the copolymer X) consisting of (a-1) 35 to 95% by weight of an aliphatic conjugated diene monomer unit, (b-1) 5 to 50% by weight of a vinyl cyanide monomer unit, (c-1) 0 to 2% by weight of an ethylenically unsaturated carboxylic acid unit and (d-1) 0 to 60% by weight of a unit of another vinylic monomer copolymerizable with the above monomers (a-1) to (c-1) wherein (a-1)+(b-1)+(c-1)+(d-1)=100% by weight, and the polymer portion having a glass transition point in the range of from −5° C. to 50° C. is a copolymer (referred to hereinafter the copolymer Y) consisting of (a-2) 10 to 60% by weight of an aliphatic conjugated diene monomer unit, (c-2) 0.5 to 30% by weight of an ethylenically unsaturated carboxylic acid monomer unit and (d-2) 10 to 89.5% by weight of a unit of a vinylic monomer copolymerizable with the above monomers (a-2) and (c-2) wherein (a-2)+(c-2)+(d-2)=100% by weight.

In this invention, the aliphatic conjugated diene monomer unit (a-1) in the copolymer X includes the monomer units mentioned above as to the aliphatic conjugated diene monomer unit (a). The proportion of said aliphatic conjugated diene monomer unit (a-1) in the copolymer X is 35 to 95% by weight, preferably 40 to 90% by weight. When the proportion of the aliphatic conjugated diene monomer unit (a-1) in the copolymer X is less than 35% by weight, the particle A becomes too hard and the bonding strength becomes inferior.

In this invention, the vinyl cyanide monomer unit (b-1) in the copolymer X includes the same monomer units as the vinyl cyanide monomer units mentioned as to the above monomer (c). The proportion of said vinyl cyanide monomer unit (b-1) in the copolymer X is 5 to 50% by weight, preferably 10 to 40% by weight. When the proportion of the vinyl cyanide monomer unit (b-1) in the copolymer X is less than 5% by weight, the printing gloss becomes remarkably low and when the proportion exceeds 50% by weight, the particle A becomes too hard and becomes inferior in bonding strength.

In this invention, the ethylenically unsaturated carboxylic acid monomer unit (c-1) in the copolymer X includes the same monomer units as mentioned as to the above ethylenically unsaturated carboxylic acid monomer unit (b). The proportion of the ethylenically unsaturated carboxylic acid monomer unit (c-1) in the copolymer X is 0 to 2% by weight, preferably 0 to 1% by weight. When the proportion of the ethylenically unsaturated carboxylic acid monomer unit in the copolymer X exceeds 2% by weight, the latex viscosity is greatly increased and the workability becomes inferior.

In this invention, the unit (d-1) of vinylic monomer copolymerizable with the monomers (a-1) to (c-1) includes the same monomer units as mentioned as to the unit (c) of vinylic monomer copolymerizable with the above monomers (a) and (b) other than the vinyl cyanide monomer units.

The monomer unit (d-1) is preferably the unit of aromatic vinyl compound or alkyl (meth)acrylate.

The amount of said monomer unit (d-1) used is 0 to 60% by weight, preferably 0 to 50% by weight. When the proportion of the monomer unit (d-1) in the copolymer X exceeds 60% by weight, the particle A becomes too hard and becomes inferior in bonding strength.

In this invention, the aliphatic conjugated diene monomer unit (a-2) used in the copolymer Y includes the same monomer units mentioned as to the above aliphatic conjugated diene monomer unit (a). The proportion of said aliphatic conjugated diene monomer unit (a-2) in the copolymer Y is 10 to 60% by weight, preferably 15 to 50% by weight. When the proportion of the aliphatic conjugated diene monomer unit (a-2) in the copolymer Y exceeds 60% by weight, the water resistance and antitackiness of the paper coating composition obtained are extremely lowered.

In this invention, the ethylenically unsaturated carboxylic acid monomer unit (c-2) used in the copolymer Y includes the same monomer units as mentioned as to the above ethylenically unsaturated carboxylic acid monomer unit (b). The proportion of the ethylenically unsaturated carboxylic acid monomer unit (c-2) in the copolymer Y is 0.5 to 30% by weight, preferably 2 to 10% by weight. When the proportion of the ethylenically unsaturated carboxylic acid monomer unit (c-2) in the copolymer Y is less than 10% by weight, the stability of the latex becomes bad, a coagulum tends to be produced, and the latex obtained is inferior in mechanical and chemical stability. On the other hand, when the proportion of the ethylenically unsaturated carboxylic acid monomer unit (c-2) in the copolymer Y exceeds 30% by weight, the latex obtained has too high a viscosity, the handling of the latex becomes difficult, the workability is lowered, and the practicability becomes insufficient.

The unit (d-2) of a vinylic monomer copolymerizable with the above monomers (a-2) and (c-2) includes the same monomer units as mentioned as to the above copolymerizable vinylic monomer unit (c).

The copolymerizable monomer unit (d-2) is preferably the unit of an aromatic vinyl compound, an alkyl (meth)acrylate or a vinyl cyanide monomer.

The proportion of the monomer unit (d-2) in the copolymer Y is 10 to 89.5% by weight, preferably 30 to 88.5% by weight. When the proportion of the copolymerizable monomer unit (d-2) in the copolymer Y is less than 10% by weight, the particle A becomes too soft, and the paper coating composition obtained becomes inferior in antitackiness and stiffness, while when the proportion exceeds 89.5% by weight, the particle A becomes too hard and becomes inferior in bonding strength.

The ratio of the copolymer X portion to the copolymer Y portion present in the particle A is such that the proportion of the copolymer X portion is 10 to 80% by weight, preferably 15 to 75% by weight and more preferably 20 to 70% by weight. When the proportion of the copolymer X portion is less than 10% by weight the paper coating composition obtained lacks boding strength in some cases, and when the proportion exceeds 80% by weight, the tackiness becomes bad.

In the present invention, the particle A has preferably a core-shell structure in which the copolymer X portion forms the core and the copolymer Y portion forms the shell.

In this invention, the average particle size of the particle A is preferably 70 to 350 nm, more preferably 80 to 250 nm.

In this invention, the toluene-insolubles content of the particle A is preferably 10 to 95% by weight, more preferably 20 to 90% by weight.

In this invention, the process for producing the particle A is preferably a process which comprises seed polymerizing monomers whose copolymer has a glass transition point of −5° C. to 50° C. in the presence of seed particles consisting of a copolymer having a glass transition point of −100° C. to 0° C., in other words, a process which comprises polymerizing a monomer mixture giving the copolymer Y in the presence of seed particles consisting of the above copolymer X.

Here, in both the production of the seed particles and the seed polymerization, conventional emulsion polymerization is used.

In this invention, for the emulsion polymerization, a known method can be adopted, and the emulsion polymerization can be carried out in an aqueous solvent using an emulsifier, a polymerization initiator, a molecular weight modifier and the like.

In this case, the emulsifier includes anionic surfactants, nonionic surfactants, amphoteric surfactants and the like, and they can be used alone or in combination of two or more.

The anionic surfactants include, for example, sulfuric acid esters of higher alcohols, alkylblenzenesulfonic acid salts, aliphatic sulfonic acid salts, sulfuric acid esters of polyethylene glycol alkyl ethers and the like.

As the nonionic surfactants, there are used usual alkyl ester type, alkyl ether type and alkylphenyl ether type of polyethylene glycol and the like.

The amphoteric surfactants include those having a carboxylic acid salt, a sulfuric acid ester salt, a sulfonic acid salt or a phosphoric acid salt as the anionic portion and an amine salt or a quaternary ammonium salt as the cationic portion. Specifically, there are used betaines such as lauryl betaine, stearyl betaine and the like; those of amino acid type such as lauryl-β-alanine, stearyl-β-alanine, lauryl di(aminoethyl) glycine, octyl di(aminoethyl)glycine and the like; etc.

The amount of the emulsifier used is preferably 0.5 to 5 parts by weight per 100 parts by weight of all the monomers.

As the polymerization initiator, water-soluble polymerization initiators such as sodium persulfate, potassium persulfate, ammonium persulfate and the like; oil-soluble polymerization initiators such as benzoyl peroxide, lauroyl peroxide, 2,2'-azobisisobutyronitrile and the like; redox type polymerization initiators in which the peroxide is combined with a reducing agent; etc. can be used alone or in combination.

The amount of the polymerization initiator used is 0.5 to 3 parts by weight per 100 parts by weight of all the monomers.

Known molecular weight modifiers, chelating agents, inorganic electrolytes and the like can be used.

As the molecular weight modifier, there can be used all those which can be used in usual emulsion polymerization, for example, halogenated hydrocarbons such as chloroform, carbon tetrabromide and the like; mercaptans such as n-hexylmercaptan, n-octylmercaptan, n-dodecylmercaptan, t-dodecylmercaptan, thioglycolic acid and the like; xanthogens such as dimethyl xanthogendisulfide, diisopropyl xanthogendisulfide and the like; terpinolene; α-methylstyrene dimer; etc.

The amount of the molecular weight modifier used is 0.1 to 5 parts by weight per 100 parts by weight of all the monomers.

The polymerization method includes (1) a method which comprises previously producing the copolymer X by polymerization in a separate reactor, feeding this copolymer X as seed particles in the desired amount to the reactor, and thereafter polymerizing the monomers giving the copolymer Y; (2) a method which comprises producing the copolymer X by polymerization, and polymerizing the monomers giving the copolymer Y in the same reactor; and the like. Incidentally, in either method, the polymerization conversion of the copolymer X is at least 50% by weight, preferably at least 70% by weight.

For charging a monomer mixture giving the copolymer Y, there can be adopted a method which comprises charging the whole amount of the monomer mixture at one time and then polymerizing the same, a method which comprises polymerizing a part of the monomer mixture and thereafter adding the remainder continuously or intermittently, a method which comprises continuously adding the monomer mixture from the beginning of the polymerization; or other methods. Also, these methods can be combined.

The polymerization temperature is usually 5° to 80° C., preferably 5° to 50° C. in the case of polymerization for producing the copolymer X, and 20° to 80° C., preferably 20° to 60° C. in the case of polymerization for producing the copolymer Y. The polymerization time is usually 10 to 30 hours.

In this invention, when a latex of the particle A is used in a composition for coating a web offset printing paper, it is preferable that the particle A has the following molecular weight distribution measured by a gel permeation chromatography (referred to hereinafter as GPC). That is, in the molecular weight distribution represented by the detection curve shown in FIG. 1 in which the axis of ordinate indicates detection amount and the axis of abscissa indicates detection time, it is preferable that assuming the area of the portion surrounded by the detection curve and the axis of abscissa as the total area, the proportion to said total area of the area of the components detected earlier than the detection time at which a polymer having a polystyrene-reduced molecular weight of 1,000,000 as measured by GPC is detected, that is, the area of the portion shown by the oblique lines in FIG. 1, is 50% or less. Said proportion is more preferably 30% or less, most preferably 20% or less.

The components detected earlier than the detection time at which a polymer having a polystyrene-reduced molecular weight of 1,000,000 is detected are super high molecular weight copolymers or their cross-linked gel components. When the proportion of said components exceeds 50%, good blister resistance is not obtained.

Also, in order for a coated paper obtained by coating the paper coating composition of this invention on a paper to have a good dry strength, the weight average molecular weight of the components detected between the detection time at which a polymer having a polystyrene-reduced molecular weight of 500 is detected and the detection time at which a polymer having a polystyrene-reduced molecular weight of 1,000,000 is detected must be at least 40,000, preferably at least 50,000 and more preferably at least 60,000. When said weight average molecular weight is less than 40,000, no coating having a good dry pick strength and wet pick strength is obtained from the paper-coating composition.

The molecular weight distribution represented by the detection curve in Table 1 is obtained by appropriately varying the polymerization temperature, the amount of a molecular weight modifier, the method of adding the monomers and the like.

Incidentally, in this invention, GPC is measured under the following conditions.

(Preparation of sample)

To 0.3 g of a copolymer latex whose solid content has been adjusted to 48% by weight are added 1 g of water and about 1 g of a cation exchange resin which has been subjected to washing with dilute hydrochloric acid and with water in a conventional manner to remove the cations. Subsequently, 50 ml of tetrahydrofuran is added, and the resulting mixture is allowed to stand for two hours to dissolve the copolymer in tetrahydrofuran. Subsequently, the solution is filtered through a polytetrafluoroethylene membrane filter (pore size: 3 µm, manufactured by ADVANTEC), and the filtrate is used as a measurement sample.

| Measurement apparatus: | HLC-8020 (manufactured by TOSOH CORP.) |
|---|---|
| Kind and particle size of filler: | Polystyrene gel, 30 µm GMHHR-H (30) manuf. by TOSOH CORP. |
| Column size: | 7.8 mm 2D × 300 mm |
| Solvent: | Tetrahydrofuran |
| Sample concentration: | 0.3% by weight |
| Pour: | 30 µl |
| Flow rate: | 1 ml/min |
| Temperature: | 40° C. |
| Detector: | Differential refractometer |

Incidentally, in the measurement, using a polystyrene standard material having a known molecular weight, a calibration curve is previously prepared, and the molecular weight obtained therefrom is indicated as a polystyrene-reduced molecular weight.

In this invention, the lowest film-forming temperature of a latex of the particle A is 0° to 60° C., preferably 5° to 50° C., more preferably 10° to 40° C. When the temperature is lower than 0° C., the paper coating composition obtained is inferior in antitackiness, and when it exceeds 60° C., the paper coating composition is inferior in bonding strength.

In this invention, the Young's modulus of the film obtained from the latex of the particle A is 1 kg/mm$^2$ or more, preferably 2 to 50 kg/mm$^2$ when the paper coating composition of this invention is used in sheet-fed offset printing, and it is 5 kg/mm$^2$ or more, preferably 5 to 50 kg/mm$^2$ when the paper coating composition is used in rotary offset printing.

In this invention, the Young's modulus of the film obtained from the latex of the particle A is measured by drying the particle A latex obtained on a glass plate at 50° C. so that the thickness of the resulting film becomes 0.2 mm to form a film and subjecting the film to Autograph AG-500B manufactured by Shimaduz Corp. at a drawing speed of 10 mm/min at 25°.

In the case of the sheet-fed offset printing, when the Young's modulus of the film obtained from the latex of the particle A is less than 1 kg/mm$^2$, it becomes difficult for the paper coating composition obtained to exhibit sufficient stiffness, wet strength and antitackiness. In the case of the rotary offset printing, when the Young's modulus of the film obtained from the latex of the particle A is less than 5 kg/mm$^2$, the stiffness and antitackiness of the paper coating composition obtained become low.

The paper coating composition of this invention is prepared by blending a latex of the above particle A and, if necessary, other binders and various compounding agents into an inorganic or organic pigment. The amount of the latex of the above particle A blended is 1 to 30 parts by weight (as solids), preferably 3 to 25 parts by weight, per 100 parts by weight of the pigment. When the amount of the latex of the particle A is less than 1 part by weight, the bonding strength is remarkably lowered, while when the amount exceeds 30 parts by weight, the ink-dryability is remarkably lowered.

The inorganic pigment includes clay, barium sulfate, titanium oxide, calcium carbonate, satin white, talc, aluminum hydroxide, zinc oxide and the like; and the organic pigment includes polystyrene latex, ureaformalin resin and the like. These can be used alone or in combination of two or more depending upon the purpose.

Said other binder includes conventional styrene-butadiene latex, ethylene-vinyl acetate latex, acrylic emulsion and the like.

As said various compounding agents, there may be compounded, for example, a water-resistance improving agent, a pigment dispersing agent, a viscosity modifier, a coloring pigment, a fluorescent dye and a pH adjustor as required.

Moreover, when the paper coating composition of this invention is used in an offset printing, as a pigment binder, there can be used water-soluble materials such as casein, modified casein, starch, modified starch, polyvinyl alcohol, carboxymethylcellulose and the like in combination, if necessary.

The paper coating composition of this invention can be appropriately used for various printings such as sheet-fed offset printing, rotary offset printing, letterpress printing, gravure printing and the like and as a coating agent for paper.

The paper coating composition of this invention exhibits such an effect as not to be obtained by the conventional paper coating compositions. That is, even when the binder content is greatly decreased, the composition has satisfactory bonding strength, printing gloss and stiffness and is also excellent in tackiness and blister resistance.

DESCRIPTION OF PREFERRED EMBODIMENTS

This invention is explained in more detail below referring to Examples. However, this invention should not be construed to be limited to the Examples. Incidentally, in the Examples, part and % are by weight unless otherwise specified.

(Production of a latex of the particle A)

Reference Examples 1 to 5

(1) Formation of the copolymer X

A temperature-controllable autoclave equipped with a stirrer was charged with 200 parts of water, 0.5 part of sodium dodecylbenzenesulfonate, 1.0 part of potassium persulfate, 0.5 part of sodium bisulfite and the molecular weight modifier and monomers giving the copolymer X shown in Table 1 at one time, and they were subjected to reaction at 45° C. for 6 hours. It was confirmed that the polymerization conversion was at least 70%.

(2) Formation of the copolymer Y

Subsequently to the polymerization in (1) above, a mixture of the molecular weight modifier and monomers giving the copolymer Y shown in Table 1 was continuously added at 60° C. over 7 hours to continue polymerization. After completion of the continuous addition, the reaction was further allowed to proceed at 70° C. for 6 hours. The final polymerization conversion was 98–99%.

The particle A thus obtained was subjected to the following measurements:

(Measurement of glass transition point)

The latex of the particle A obtained was subjected to vacuum drying at 100° C. for 20 hours to form a film. The dried film thus obtained was subjected to measurement by a differential scanning calorimeter (manufactured by DU PONT DE NEMOURS & COMPANY) according to the ASTM method.

(Measurement of particle size of latex)

The average particle size of the latex of the copolymer obtained was determined in a conventional manner by means of a submicroanalyzer (Model N4) manufactured by Coaltar.

(Measurement of toluene-insolubles content)

The toluene-insolubles content of the copolymer latex was measured as follows: The pH of the copolymer latex was adjusted to 8, thereafter the copolymer was coagulated by adding isopropanol and the coagulum obtained was washed and dried, after which the predetermined amount (about 0.03 g) of the sample was immersed in the predetermined amount (100 ml) of toluene for twenty hours. Thereafter, the sample immersed in toluene was filtered through a wire net of 120 mesh, and the weight percentage of the remaining solids obtained based on the weight of the total solids charged was determined.

(Measurement of Young's modulus)

The Young's modulus of the copolymer latex obtained was measured as follows: The copolymer latex obtained was dried on a glass plate at room temperature so that the thickness of film became 0.2 mm to form a film. The film thus obtained was subjected to measurement of Young's modulus by Autograph AG-500B manufactured by Shimaduz Corp. at 25° C. at a drawing speed of 10 mm/min.

The results obtained are shown in Table 1.

Reference Examples 6 to 8

(1) Formation of the copolymer X

A temperature-controllable autoclave equipped with a stirrer was charged with 150 parts of water, 2 parts of sodium dodecylbenzenesulfonate, 0.2 part of potassium persulfate and the components shown in Table 2 at one time, and they were subjected to reaction at 45° C. for 8 hours. When the polymerization conversion reached 70%, 0.1 part of N,N-diethylhydroxylamine was added to terminate the polymerization. Subsequently, the unreacted monomers were removed by steam stripping, and after cooling, the solid content was adjusted to 25%.

(2) Formation of the copolymer Y

A temperature-controllable autoclave equipped with a stirrer which was separate from that used in (1) above was charged with 120 parts (30 parts as solid content) of the latex of the copolymer X obtained in (1) above after the solid content adjustment, 60 parts of water, 0.5 part of sodium dodecylbenzenesulfonate, 1.0 part of potassium persulfate and the components shown in Table 2 at one time, and they were subjected to reaction at 65° C. for 8 hours. The final polymerization conversion was 98–99%.

The particle A thus obtained was subjected to measurement of glass transition point, average particle size, toluene-insolubles content and Young's modulus.

The results obtained are shown in Table 2.

Examples 1 to 8

Using the particle A latex produced in each of Reference Examples 1 to 8, a paper coating composition suitable for sheet-fed offset printing was prepared according to the following recipe:

| Compounding | |
| --- | --- |
| Kaolin clay: | 70.0 parts |
| Calcium carbonate: | 30.0 parts |
| Sodium polyacrylate: | 0.2 part |
| Sodium hydroxide: | 0.1 part |
| Starch: | 4.0 parts |
| Particle A latex (as solids): | 10.0 parts |
| Water: | Such an amount that the total solid content became 60%. |

This paper coating composition was coated on an original paper to be coated so that the amount of the composition coated on one side became 18.0±0.5 g/m² by a motor-driven blade coater (manufactured by Kumagai Riki Kogyo) and then dried for 15 seconds by an electric hot air drier at 150° C. The coated paper obtained was allowed to stand in a thermo-hygrostat at a temperature of 23° C. at a humidity of 50% for 24 hours, and thereafter, subjected to supercalender treatment four times under the conditions of line pressure of 100 kg/cm and roll temperature of 50° C. The evaluation of the performance of the coated paper obtained was effected by the following methods:

1) Dry pick strength

The degree of picking when the paper was printed by an RI press was judged with the naked eye, and evaluated by a five-grade method. The less picking phenomenon was given a higher grade. The numerical value was the average of six evaluations.

2) Wet pick strength

Using an RI press, the surface of a coated paper was wetted by a molton roll, and thereafter, the degree of picking when the coated paper was printed by an RI press was judged with the naked eye, and evaluated by a five-grade method. The less picking phenomenon was given a higher grade. The numerical value was the average of six evaluations.

3) Printing gloss

Using an RI press, an offset ink was solid-printed, and gloss was measured at an angle of 60° using a gloss meter of the Murakami type.

4) Stiffness

Measured according to JIS P8143 using an automatic Clark stiffness tester (manufactured by Kumagai Riki Kogyo).

5) Tackiness

The latex was coated on a PET film by a No. 18 rod and dried at 120° C. for 30 seconds to form a coating. This coated film was put on a black flockpaper so that the coating contacted the flockpaper and the resulting assembly was contact-bonded by a bench supercalender under the conditions of line pressure of 200 kg/cm and temperature of 70° C. The film was peeled from the black flockpaper and the degree of transfer of the black flockpaper to the latex was evaluated visually based on a five-grade evaluation. The lower degree of transfer was give a higher grade. The numerical value was the average of six evaluations.

The results obtained by the above evaluation methods are shown in Table 3.

Comparative Reference Examples 1 and 2

In the same manner as in Reference Example 1, 200 parts of water, 0.5 part of sodium dodecylbenzenesulfonate, 1.0 part of potassium persulfate, 0.5 part of sodium bisulfite and the first component consisting of molecular weight modifiers and monomers shown in Table 3 were charged at one time into a temperature-controllable autoclave equipped with a stirrer, and were subjected to reaction at 60° C. for 2 hours, upon which the polymerization conversion reached 90–95%.

Subsequently, the second component shown in Table 3 was continuously added at 70° C. over 7 hours to continue the polymerization, and after completion of the continuous addition, the reaction was allowed to proceed at 75° C. for a further 6 hours, to obtain a copolymer latex. The final polymerization conversion was 98–99%.

Comparative Reference Example 3

In the same manner as in Reference Example 1, 200 parts of water, 0.5 part of sodium dodecylbenzenesulfonate, 1.0 part of potassium persulfate, 0.5 part of sodium bisulfite and the first component consisting of molecular weight modifiers and monomers shown in Table 3 were charged into a temperature-controllable autoclave equipped with a stirrer at one time, and subjected to reaction at 50° C. for 6 hours, and after it was confirmed that the polymerization conversion reached 80% or more, the second component shown in Table 3 was subsequently continuously added at 70° C. over 7 hours, to continue the polymerization, and after completion of the continuous addition, the reaction was allowed to proceed at 75° C. for a further 6 hours to obtain a copolymer latex. The final polymerization conversion was 98–99%.

Comparative Examples 1 to 3

The same procedure as in Example 1 was repeated, except that each of the copolymer latexes obtained in Comparative Reference Examples 1 to 3 was substituted for the particle A latex, to prepare a paper coating composition, and in the same manner as in Example 1, a coated paper was prepared using the paper coating composition obtained and was subjected to evaluation of performance.

The results obtained are shown in Table 3.

Reference Examples 9 to 13 and Comparative Reference Examples 4 to 6

In the same manner as in Reference Example 1, except that the kinds and amounts of monomer and molecular weight modifier were changed to those shown in Table 4, a copolymer (particle A) was obtained.

The latex of the particle A obtained was subjected to measurement of glass transition point, particle size, toluene-insolubles content, Young's modulus in the same manner as in Reference Example 1. The results obtained are shown in Tables 4 and 5.

Incidentally, GPC was measured as follows.

(Measurement of GPC)

To 0.3 g of the particle A latex whose solid content had been adjusted to 48% by weight were added 1 g of water and about 1 g of a cation exchange resin which had been subjected to washing with dilute hydrochloric acid and with water in a conventional manner, to remove the cations. Subsequently, 50 ml of tetrahydrofuran was added, and the resulting mixture was allowed to stand for 2 hours to dissolve the copolymer in tetrahydrofuran. Subsequently, the solution was filtered through a polytetrafluoroethylene membrane filter (pore size: 3 µm, manufactured by ADVANTEC), and the filtrate was used as a measurement sample.

| Measurement apparatus: | HLC-8020 (manufactured by TOSOH CORP.) |
|---|---|
| Kind and particle size of filler: | Polystyrene gel, 30 μm GMHHR-H (30) manuf. by TOSOH CORP. |
| Column size: | 7.8 mm 2D × 300 mm |
| Solvent: | Tetrahydrofuran |
| Sample concentration: | 0.3% by weight |
| Pour: | 30 μl |
| Flow rate: | 1 ml/min |
| Temperature: | 40° C. |
| Detector: | Differential refractometer |

Incidentally, in the measurement, a calibration curve was previously prepared using a polystyrene standard material having a known molecular weight, and the molecular weight obtained therefrom was indicated as a polystyrene-reduced molecular weight.

GPC measurement result 1: The proportion of the area of the components detected earlier than the detection time at which a polymer having a polystyrene-reduced molecular weight of 1,000,000 was detected in the detection curve as shown in FIG. 1 to the total area which is the area of the portion surrounded by the detection curve and the axis of abscissa as in FIG. 1.

GPC measurement result 2: The weight average molecular weight of the components detected between the detection time at which a polymer having a polystyrene-reduced molecular weight of 500 was detected and the detection time at which a polymer having a polystyrene-reduced molecular weight of 1,000,000 was detected.

Examples 9 to 13 and Comparative Examples 4 to 6

The same procedure as in Example 1 was repeated, except that the copolymer latex used in Example 1 was replaced by the copolymer latexes obtained in Reference Examples 9 to 13 and Comparative Reference Examples 4 to 6, to produce paper coating compositions suitable for rotary offset printing.

Each of the paper coating compositions was coated on an original paper to be coated and dried in the same manner as in Example 1, except that both sides of the original paper to be coated were coated with the composition.

The dry pick strength, wet pick strength, printing gloss, stiffness and tackiness of each of the coated papers obtained were measured in the same manner as in Example 1. Further, the blister resistance was measured as follows:

(Blister resistance)

The double coated paper was subjected to moisture conditioning (about 6%), and thereafter, threw into a heated oil bath, and the lowest temperature at which blister was caused was measured. This temperature is indicated as blister resistance.

TABLE 1

| | Example | | | | |
|---|---|---|---|---|---|
| Component | 1 | 2 | 3 | 4 | 5 |
| Copolymer X | | | | | |
| Butadiene | 20 | 30 | 35 | 24 | 28 |
| Styrene | 5 | 15 | 15 | — | — |
| Acrylonitrile | 5 | 5 | 5 | 16 | 11.5 |
| Methyl methacrylate | — | — | 15 | — | — |

TABLE 1-continued

| | Example | | | | |
|---|---|---|---|---|---|
| Component | 1 | 2 | 3 | 4 | 5 |
| Itaconic acid | — | — | — | — | 0.5 |
| α-methylstyrene dimer | — | 0.1 | 0.1 | — | — |
| Terpinolene | 0.1 | — | — | — | 0.5 |
| t-Dodecylmercaptan | 0.1 | 0.2 | 0.2 | 0.3 | 0.2 |
| Polymern. conversion of copolymer X (%) | 91 | 89 | 86 | 95 | 87 |
| Copolymer Y | | | | | |
| Butadiene | 30 | 20 | 10 | 25 | 20 |
| Styrene | 12 | 12 | 10 | 25 | 19 |
| Acrylonitrile | 10 | 10 | 7 | 6 | 7 |
| Methyl methacrylate | 15 | 5 | — | 10 | 10 |
| Acrylic acid | 1 | 1 | 1 | 2 | 1 |
| Fumaric acid | 2 | 1 | — | — | 1 |
| Itaconic acid | — | 1 | 2 | 2 | 2 |
| α-Methylstyrene dimer | — | 0.3 | 0.2 | — | — |
| Terpinolene | 0.5 | — | — | — | 0.5 |
| t-Dodecylmercaptan | 0.5 | 0.3 | 0.1 | 0.4 | 0.3 |
| Polymern. conversion of particle A (%) | 98 | 98 | 99 | 98 | 99 |
| Glass transition point 1 (°C.) | −56 | −35 | −18 | −30 | −43 |
| Glass transition point 2 (°C.) | 0 | 2 | 10 | 4 | 8 |
| Particle size (nm) | 115 | 125 | 110 | 120 | 135 |
| Toluene-insolubles (%) | 89 | 85 | 79 | 92 | 88 |
| Young's modulus (kg/mm$^2$) | 4.2 | 4.6 | 6.8 | 5.1 | 6.5 |
| Physical properties of paper coating composition | | | | | |
| RI dry pick | 4.6 | 4.3 | 3.7 | 4.3 | 4.0 |
| RI wet pick | 4.1 | 4.3 | 4.5 | 4.5 | 5.0 |
| Printing gloss (%) | 78.5 | 79.6 | 80.2 | 79.0 | 79.5 |
| Stiffness | 47.5 | 50.3 | 54.2 | 52.8 | 55.3 |
| Tackiness | 3.5 | 3.9 | 4.5 | 4.5 | 4.6 |

TABLE 2

| | Example | | |
|---|---|---|---|
| Component | 6 | 7 | 8 |
| Copolymer X | | | |
| Butadiene | 70 | 60 | 70 |
| Styrene | — | — | 15 |
| Acrylonitrile | 30 | 40 | 15 |
| t-Dodecylmercaptan | 0.4 | 0.4 | 0.5 |
| Polymern. conversion of copolymer X (%) | 70 | 70 | 70 |
| Copolymer Y | | | |
| Butadiene | 28 | 25 | 25 |
| Styrene | 24 | 32 | 27 |
| Acrylonitrile | 10 | 5 | 10 |
| Methyl methacrylate | 5 | 5 | 5 |
| Acrylic acid | 1 | 1 | 1 |
| Fumaric acid | 2 | 1 | 2 |
| Itaconic acid | — | 1 | — |
| α-Methylstyrene dimer | — | 0.2 | — |
| Terpinolene | 0.3 | — | — |
| t-Dodecylmercaptan | 0.2 | 0.3 | 0.5 |
| Polymern. conversion of particle A (%) | 98 | 98 | 99 |
| Glass transition point 1 (°C.) | −43 | −31 | −46 |
| Glass transition point 2 (°C.) | 2 | 5 | 7 |
| Particle size (nm) | 148 | 145 | 150 |
| Toluene-insolubles (%) | 88 | 89 | 78 |
| Young's modulus (kg/mm$^2$) | 4.6 | 5.2 | 6.3 |
| Physical properties of paper | | | |

TABLE 2-continued

| Component | Example 6 | Example 7 | Example 8 |
|---|---|---|---|
| coating composition | | | |
| RI dry pick | 4.9 | 4.8 | 4.9 |
| RI wet pick | 4.2 | 4.9 | 5.0 |
| Printing gloss (%) | 80.5 | 81.5 | 79.2 |
| Stiffness | 49.3 | 54.5 | 50.5 |
| Tackiness | 3.7 | 4.4 | 4.8 |

TABLE 3

| Component | Comparative Example 1 | Comparative Example 2 | Comparative Example 3 |
|---|---|---|---|
| First component | | | |
| Butadiene | 8 | 8 | 5 |
| Styrene | 4 | 7 | 25 |
| Acrylonitrile | 2 | 2 | 3 |
| Methyl methacrylate | 3 | 4 | 7 |
| Acrylic acid | 1 | 2 | — |
| Fumaric acid | 2 | 2 | — |
| α-Methylstyrene dimer | — | 0.2 | 0.1 |
| Terpinolene | 0.5 | — | — |
| t-Dodecylmercaptan | 0.2 | 0.3 | 0.2 |
| Polymern. conversion of first component (%) | 92 | 91 | 95 |
| Second component | | | |
| Butadiene | 42 | 28 | 27 |
| Styrene | 18 | 29 | 14 |
| Acrylonitrile | 8 | 8 | 8 |
| Methyl methacrylate | 12 | 10 | 8 |
| Acrylic acid | — | — | 1 |
| Itaconic acid | — | — | 2 |
| α-Methylstyrene dimer | — | 0.6 | 0.3 |
| Terpinolene | 0.5 | — | — |
| t-Dodecylmercaptan | 0.5 | 0.2 | 0.4 |
| Polymern. conversion (%) | 99 | 98 | 99 |
| Glass transition point 1 (°C.) | — | — | 60 |
| Glass transition point 2 (°C.) | −15 | 5 | −3 |
| Particle size (nm) | 105 | 120 | 110 |
| Toluene-insolubles (%) | 85 | 90 | 87 |
| Young's modulus (kg/mm$^2$) | 0.6 | 3.2 | 0.8 |
| Physical properties of paper coating composition | | | |
| RI dry pick | 4.5 | 2.5 | 2.5 |
| RI wet pick | 1.0 | 4.0 | 1.8 |
| Printing gloss (%) | 77.5 | 76.6 | 78.2 |
| Stiffness | 40.3 | 55.5 | 49.5 |
| Tackiness | 1.5 | 4.5 | 1.9 |

TABLE 4

| Component | Example 9 | Example 10 | Example 11 | Example 12 | Example 13 |
|---|---|---|---|---|---|
| Copolymer X | | | | | |
| Butadiene | 21 | 30 | 35 | 27 | 28 |
| Styrene | — | 10 | 10 | — | 6.5 |
| Acrylonitrile | 9 | 10 | 10 | 3 | 5 |
| Methyl methacrylate | — | — | 15 | — | — |
| Itaconic acid | — | — | — | — | 0.5 |
| α-Methylstyrene dimer | 0.1 | 0.1 | 0.1 | — | — |
| t-Dodecylmercaptan | 0.4 | 0.5 | 0.6 | 0.3 | 0.4 |
| Polymern. conversion of copolymer X (%) | 85 | 80 | 78 | 87 | 79 |
| Copolymer Y | | | | | |
| Butadiene | 15 | 10 | 5 | 15 | 11 |
| Styrene | 20 | 22 | 12 | 22 | 26 |
| Acrylonitrile | 12 | 5 | 5 | 15 | 10 |
| Methyl methacrylate | 20 | 10 | 5 | 15 | 10 |
| Acrylic acid | 2 | 1 | 1 | 2 | 1 |
| Fumaric acid | — | — | 2 | — | — |
| Itaconic acid | 1 | 2 | — | 1 | 2 |
| α-Methylstyrene dimer | 0.8 | 0.8 | 0.5 | — | — |
| Terpinolene | — | — | — | 1.0 | 1.0 |
| t-Dodecylmercaptan | 0.8 | 0.7 | 0.4 | 0.6 | 0.4 |
| Polymern. conversion of particle A (%) | 98 | 97 | 99 | 98 | 96 |
| Glass transition point 1 (°C.) | −35 | −30 | −18 | −43 | −35 |
| Glass transition point 2 (°C.) | 25 | 27 | 35 | 20 | 21 |
| Particle size (nm) | 112 | 121 | 115 | 119 | 117 |
| Toluene-insolubles (%) | 0 | 5 | 18 | 0 | 12 |
| GPC measurement result 1 (%) | 12 | 17 | 13 | 8 | 9 |
| GPC measurement result 2 | 8.5 | 70* | 70* | 60* | 70* |
| Young's modulus (kg/mm$^2$) | 8.5 | 8.6 | 10.7 | 7.8 | 7.9 |
| Physical properties of paper coating composition | | | | | |
| RI dry pick | 4.0 | 4.5 | 4.4 | 4.3 | 4.2 |
| RI wet pick | 4.8 | 4.5 | 4.3 | 4.0 | 4.7 |
| Printing gloss (%) | 79.5 | 78.6 | 80.2 | 79.0 | 79.5 |
| Stiffness | 49.5 | 47.3 | 48.2 | 47.5 | 47.9 |
| Tackiness | 4.8 | 4.0 | 4.5 | 4.3 | 4.6 |
| Blister resistance (°C.) | 240 | 230 | 240 | 240 | 235 |

Note: *: × 10$^3$

TABLE 5

| Component | Comparative Example 4 | Comparative Example 5 | Comparative Example 6 |
|---|---|---|---|
| Copolymer X | | | |
| Butadiene | 7 | 8 | 5 |
| Styrene | 5 | 6 | 8 |
| Acrylonitrile | 5 | 4 | 3 |
| Methyl methacrylate | 5 | 4 | 7 |
| Acrylic acid | 2 | 1 | 1 |
| Itaconic acid | 1 | 2 | 1 |
| α-Methylstyrene dimer | 0.2 | 0.2 | — |
| Terpinolene | — | — | 0.2 |
| t-Dodecylmercaptan | 0.2 | 0.3 | 0.2 |
| Polymern. conversion of copolymer X (%) | 69 | 85 | 89 |
| Copolymer Y | | | |
| Butadiene | 29 | 32 | 25 |
| Styrene | 15 | 26 | 17 |
| Acrylonitrile | 16 | 11 | 15 |
| Methyl methacrylate | 15 | 6 | 17 |
| Acrylic acid | — | — | 1 |
| α-Methylstyrene dimer | 1.0 | 0.8 | — |
| Terpinolene | — | — | 0.8 |
| t-Dodecylmercaptan | 0.9 | 0.8 | 0.6 |
| Polymern. conversion of particle A (%) | 99 | 98 | 98 |
| Glass transition point 1 (°C.) | −9 | −12 | — |
| Glass transition point 2 (°C.) | — | — | 11 |

TABLE 5-continued

|  | Comparative Example | | |
|---|---|---|---|
| Component | 4 | 5 | 6 |
| Particle size (nm) | 105 | 120 | 110 |
| Toluene-insolubles (%) | 32 | 45 | 62 |
| GPC measurement result 1 | 25 | 38 | 56 |
| GPC measurement result 2 | 30* | 20* | 20* |
| Young's modulus (kg/mm$^2$) | | | |
| Physical properties of paper coating composition | | | |
| RI dry pick | 2.5 | 3.5 | 3.0 |
| RI wet pick | 3.0 | 1.5 | 3.8 |
| Printing gloss (%) | 77.5 | 76.6 | 76.2 |
| Stiffness | 42.5 | 41.2 | 47.2 |
| Tackiness | 2.5 | 1.6 | 4.2 |
| Blister resistance (°C.) | 235 | 230 | 220 |

Note: *: × 103

What is claimed is:

1. A paper coating composition which comprises as a binder a latex of a particle A consisting of (a) 20 to 80% by weight of aliphatic conjugated diene monomer units, (b) 0.5 to 10% by weight of ethylenically unsaturated carboxylic acid monomer units and (c) 20 to 79.5% by weight of units of one or more additional monomers copolymerizable with the above monomers (a) and (b) wherein (a)+(b)+(c)=100% by weight and having two glass transition points in the range of from −100° C. to 50° C., and wherein said particle A has a core-shell structure where said core consists of 20 to 70% by weight of a portion (1) in which the glass transition point is in the range of from −100° C. to 0° C. and said shell consists of 30–80% by weight of another portion (2) in which the glass transition point is in the range of from −5° C. to 50° C., and wherein the difference between the two glass transition points is 10° to 100° C., and wherein a weight average molecular weight of said particle A is at least 40,000, and wherein a weight average molecular weight of said shell is at least 40,000.

2. The paper coating composition according to claim 1, wherein the portion 1 is composed of a copolymer (referred to hereinafter as the copolymer X) consisting of (a-1) 35 to 95% by weight of an aliphatic conjugated diene monomer unit, (b-1) 5 to 50% by weight of a vinyl cyanide monomer unit, (c-1) 0 to 2% by weight of an ethylenically unsaturated carboxylic acid monomer unit and (d-1) 0 to 60% by weight of a unit of another vinylic monomer copolymerizable with the above monomers (a-1) to (c-1) wherein (a-1)+(b-1)+(c-1)+(d-1)=100% by weight and the portion 2 is composed of a copolymer (referred to hereinafter as the copolymer Y) consisting of (a-2) 10 to 60% by weight of an aliphatic conjugated diene monomer unit, (c-2) 0.5 to 30% by weight of an ethylenically unsaturated carboxylic acid monomer unit and (d-2) 10 to 89.5% by weight of a unit of another monomer copolymerizable with the above monomers (a-2) and (c-2) wherein (a-2)+(c-2)+(d-2)=100% by weight.

3. The paper coating composition according to claim 2, wherein the glass transition point of the copolymer Y is at least 5° C. higher than the glass transition point of the copolymer X.

4. The paper coating composition according to claim 2, wherein the monomer (d-1) is at least one member selected from the group consisting of aromatic vinyl monomers, alkyl (meth)acrylate monomers, vinyl acetate and acrylamide monomers.

5. The paper coating composition according to claim 2, wherein the monomer (d-2) is at least one member selected from the group consisting of aromatic vinyl monomers, alkyl (meth)acrylate monomers, vinyl acetate, vinyl cyanide monomers and acrylamide monomers.

6. The paper coating composition according to claim 1, wherein the particle A satisfies the following conditions (A) and (B) and the composition is for rotary offset printing:

(A) in the molecular weight distribution obtained from the measurement of gel permeation chromatography, the proportion of the area of the components detected earlier than the detection of a polymer having a polystyrene-reduced molecular weight of 1,000,000 is 50% or less of the total area.

(B) the weight average molecular weight of the components detected between the detection of a polymer having a polystyrene-reduced molecular weight of 500 and the detection of a polymer having a polystyrene-reduced molecular weight of 1,000,000 is 40,000 or more.

7. The paper coating composition according to claim 1, wherein the particle A is a copolymer obtained by polymerizing (Y) 10 to 95 parts by weight of a monomer component consisting of (a-2) 10 to 60% by weight of an aliphatic conjugated diene monomer, (b-2) 0.5 to 30% by weight of an ethylenically unsaturated carboxylic acid monomer and (c-2) 10 to 89.5% by weight of another monomer copolymerizable with the above monomers (a-2) and (b-2) wherein (a-2)+(b-2)+(c-2)=100% by weight, in the presence of (X) 5 to 90 parts by weight of a copolymer consisting of (a-1) 35 to 95% by weight of an aliphatic conjugated diene monomer unit, (b-1) 5 to 50% by weight of a vinyl cyanide monomer unit, (c-1) 0 to 2% by weight of an ethylenically unsaturated carboxylic acid monomer unit and (d-1) 0 to 60% by weight of a unit of another vinylic monomer copolymerizable with the above monomers (a-1) to (c-1) wherein (a-1)+(b-1)+(c-1)+(d-1)=100% by weight, the total amount of said component (X) and said component (Y) being 100 parts by weight.

8. The paper coating composition according to claim 1, wherein the Young's modulus of a film obtained from the latex of the particle A is 1 kg/mm$^2$ or more and the composition is for sheet-fed offset printing.

9. The paper coating composition according to claim 1, wherein the Young's modulus of a film obtained from the latex of the particle A is 5 kg/mm$^2$ or more and the composition is for web offset printing.

* * * * *